(12) United States Patent
Schmitz et al.

(10) Patent No.: US 7,357,978 B2
(45) Date of Patent: Apr. 15, 2008

(54) FLEXIBLE ELECTRIC PAPER DISPLAY APPARATUS

(75) Inventors: Gregory P. Schmitz, Los Gatos, CA (US); Michael B. Heaney, Palo Alto, CA (US); Eric J. Shrader, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 10/739,614

(22) Filed: Dec. 18, 2003

(65) Prior Publication Data

US 2005/0136244 A1   Jun. 23, 2005

(51) Int. Cl.
   *B32B 5/16*   (2006.01)
(52) U.S. Cl. ...................... 428/323; 428/327
(58) Field of Classification Search ............ None
   See application file for complete search history.

(56) References Cited

U.S. PATENT DOCUMENTS

| | | | |
|---|---|---|---|
| 4,126,854 A | 11/1978 | Sheridon | |
| 5,389,945 A | 2/1995 | Sheridon | |
| 5,723,204 A | 3/1998 | Stefik | |
| 6,222,513 B1 | 4/2001 | Howard et al. | |
| 6,235,395 B1 | 5/2001 | Sacripante et al. | |
| 6,445,490 B1* | 9/2002 | Chopra et al. | 359/296 |
| 2002/0099114 A1 | 7/2002 | Nakayoshi et al. | |
| 2002/0102385 A1 | 8/2002 | Kuhl et al. | |
| 2002/0131151 A1* | 9/2002 | Engler et al. | 359/296 |

* cited by examiner

*Primary Examiner*—Monique R. Jackson
(74) *Attorney, Agent, or Firm*—Fay Sharpe LLP

(57) ABSTRACT

The present exemplary embodiment relates to the use of electronic display materials for electric paper applications. It utilizes an elastomeric ground plane to render electric paper applications more flexible than has been heretofore realized. In other forms, all layers of the electric paper are formed with elastomeric material to provide further flexibility and stretchability.

22 Claims, 10 Drawing Sheets

| Material Types: | Product Code: | Mil-G-83528 |
|---|---|---|
| Carbon Filled Silicone | 43-XXXX-XXXX | N/A |
| Nickel Filled Silicone | 46-XXXX-XXXX | N/A |
| Pure Silver Filled Silicone | 49-XXXX-XXXX | Type H |
| Silver Glass Filled Silicone | 52-XXXX-XXXX | Type M |
| Silver Copper Filled Silicone | 55-XXXX-XXXX | Type A |
| Silver Aluminum Filled Silicone | 58-XXXX-XXXX | Type |
| Custom Gasket or Extrusion | XX-1015-TBD | As Required |

SPECIFICATIONS:

| Product Code | | 43 | 46 | 49 | 52 | 55 | 58 |
|---|---|---|---|---|---|---|---|
| Filler | | Carbon | Nickel | Silver | Silver Glass | Silver Copper | Silver Aluminum |
| Operating Temperature | max/min | 200/-55 | 200/-55 | 180/-55 | 200/-55 | 125/-55 | 160/-55 |
| Specific Gravity | gm/cc | 1.2 | 1.95 | 4.0 | 1.8 | 3.5 | 2.0 |
| Hardness | shore A | 70 | 70 | 80 | 65 | 65 | 65 |
| Compression Deflection | % min | 3.5 | 305 | 2.5 | 3.5 | 3.5 | 3.5 |
| Tensile Strength | #/in. sq. | 450 | 150 | 400 | 200 | 200 | 200 |
| Elongation | % | 160 | 300 | 290 | 280 | 300 | 300 |
| Compression Set | % | 30 | 35 | 60 | 30 | 32 | 32 |
| Tear Strength | #/in. | 15 | 40 | 60 | 30 | 25 | 30 |
| Volume Resistivity | Ohm-cm | 6-8 | 0.100 | 0.005 | 0.006 | 0.004 | 0.008 |

*FIG. 6*

FLEXIBLE ELECTRIC PAPER DISPLAY APPARATUS

BACKGROUND

The present exemplary embodiment relates to the use of electronic display materials for electric paper applications. It finds particular application in rendering electric paper applications flexible by providing an elastomeric ground plane to electric paper structures, and will be described with particular reference thereto. However, it is to be appreciated that the present exemplary embodiment is also amenable to other like applications.

By way of background, electric paper can be defined as any electronically-addressable display medium that approximates paper in form and function. To be most versatile, electric paper should be light-weight, thin and flexible, and it should display images indefinitely while consuming little or no power. In addition, electric paper should be reusable. One must be able to erase images and create new ones repeatedly. Preferably, electric paper should display images using reflected light and allow a very wide viewing angle.

One way to make electric paper possible using traditional electronic display technology is to completely remove the driving electronics from an electronic display package and use external addressing electrodes to write and erase images. This approach both reduces the per unit cost of electronic paper sheets and enables the use of cheap, flexible plastic films in place of glass plates for packaging. Multiple electronic paper sheets can then be addressed by a single set of external driving electronics, much like multiple sheets of pulp paper are printed on by a single printer.

A known sheet and display system, dubbed Gyricon, is disclosed in various patents and articles, such as U.S. Pat. No. 4,126,854 by Sheridon titled "Twisting Ball Display." The Gyricon display system is comprised of an elastomeric host layer of approximately 300 micrometers thick which is heavily loaded with rotating elements, possibly spheres, tens of micrometers (e.g. 100 micrometers) in diameter. Each rotating element has halves of contrasting colors, such as a white half and a black half. Each bichromal rotating element also possesses an electric dipole, nominally orthogonal to the plane that divides the two colored halves. Each bichromal rotating element is contained in its own cavity filled with a dielectric liquid. Upon application of an electric field between electrodes located on opposite surfaces of the host layer, the rotating elements will rotate depending on the polarity of the field, presenting one or the other colored half to an observer.

A Gyricon sheet has many of the requisite characteristics of electric paper, namely, bistable image retention, wide viewing angle, thin and flexible packaging, and high reflectance and resolution. U.S. Pat. No. 5,389,945 issued to Sheridon on Feb. 14, 1995, and titled "Writing System Including Paper-Like Digitally Addressed Media and Addressing Device Therefor," describes an electric paper printing system that employs independent, external addressing means to put images on the Gyricon sheets. The external addressing means is described as a one-dimensional array of electrodes connected, either directly or by wireless technology, to modulating electronics. As the one-dimensional array is scanned across the sheet, modulating electronics adjust the potential at the individual electrodes, creating electric fields between the electrodes and an equipotential surface. An image is created in the sheet according to the polarity of the electric fields.

FIG. 1 shows a representation of a Gyricon sheet comprised of a plurality of bichromal rotating elements cast in a retaining medium 200. It is contained between a first encapsulating layer 202 and a second encapsulating layer 204. The sheet 200 and encapsulating layers 202, 204 are placed in proximity to a supporting back plane 206 that is electrically grounded. An external addressing device 208 connected to a power supply 210 is depicted moving across the sheet in a direction D. Each bichromal sphere 220, 226, 232 is contained in its own liquid-filled cavity 221, 227, 233 within the retaining medium 200. An electric field exists directly between the external addressing device 208 and the equipotential surface 206 that causes the local bichromal sphere 226 to rotate.

To improve performance, different and more recent embodiments of these sheets usually incorporate charge-retaining islands thereon. Such embodiments are described in U.S. Pat. No. 6,222,513 B1, issued Apr. 24, 2001 and entitled "Charge Retention Islands for Electric Paper and Applications Thereof." Turning now to FIG. 2, an exemplary Gyricon sheet of this type is shown. The Gyricon sheet is comprised of the following elements: A sheet 300, a first encapsulating layer 302 patterned with conductive charge-retaining islands 306, and a second encapsulating layer 304 that may or may not be pattered with charge-retaining islands.

Together, the first encapsulating layer 302 and the second encapsulating layer 304 do the following things: indefinitely contain a sheet 300, provide at least one transparent window through which the sheet 300 can be viewed, and provide at least one external surface patterned with charge retaining islands 304 that can be addressed with an external charge transfer device. The first encapsulating layer 302 and second encapsulating layer 304 could take the form of thin plastic sheets that are sealed or fastened around the perimeter of the sheet 300. The second encapsulating layer 304 need not be entirely separate from the first encapsulating layer 302. The second encapsulating layer 304 could simply be an extension of the first encapsulating layer 302, folded over and around the edge of the sheet and then sealed or fastened around the remaining perimeter. The first encapsulating layer 302 and second encapsulating layer 304 could also take the form of a coating, applied by spraying, doctoring, or some other method to hold the contents of the sheet 300.

FIG. 2 also shows a pattern for the charge retaining islands 306 of the outer surface of the first encapsulating layer 302. Charge-retaining islands 306 have square perimeters and are organized in a regular two-dimensional array. Narrow channels 303 of insulating material separate the charge-retaining islands 306. The channels 303 serve to isolate the charge-retaining islands 306, preventing migration of charge laterally across the encapsulating sheet, and should be small with respect to the charge-retaining islands 306, so that the maximum possible area of the display is covered with conductive charge-retaining material.

FIG. 3 simply illustrates a second possible embodiment of a charge-retaining island pattern that utilizes a random array. The top view of the first encapsulating layer 400 shows randomly-shaped and oriented charge retaining islands 404 separated by channels 402. Charge retaining islands 404 must still be relatively large compared to the channels 402, but in such a random distribution, both feature sizes must be much smaller than the pixel size of a displayed image.

The charge retaining islands can be created on or in an encapsulating layer by many means with any conductive material. One technique, which has been tested, creates islands of conductive and transparent Indium Tin Oxide (ITO) on a transparent polyester film. The polyester is coated with a very thin layer of ITO, and then channels are etched in the ITO by photolithographic processes well known in the art. The remaining conductive ITO regions act as charge retaining islands, while insulating channels are created by the underlying polyester.

However, difficulties exist with known electric paper technology. Notably, the limited flexibility heretofore realized in electric paper could be greatly improved. The current electric paper embodiments and associated structures are inherently rigid. The reasons for this rigid nature are clear. In the current embodiment, as shown in FIGS. 1-3 above, the electric paper typically has display material, or a media plane (such as the sheets 200 or 300), sandwiched between a ground plane, or encapsulating layer (such as 204 or 304), and an image plane, or encapsulating layer (such as 202 or 302). Both of these encapsulating layers or planes are formed from sheets having high modulus and low elongation properties i.e., resistant to stretching. Accordingly, the electric paper currently known does not possess flexibility resembling that of paper. Moreover, dual-sided imaging is also less desirable given the rigidity of the current embodiments of electric paper.

Therefore, it would be a significant improvement to electric paper technology to increase its flexibility. The embodiments described herein are directed to overcoming the noted deficiencies of this prior technology so that electric paper having the flexibility of real paper can ultimately be realized.

BRIEF DESCRIPTION

In accordance with one aspect of the present exemplary embodiment, a flexible display apparatus comprises a first encapsulating layer, a second encapsulating layer formed of a first elastomeric material, and a media layer disposed between the first encapsulating layer and the second encapsulating layer wherein the media layer comprises microencapsulated multi-chromal spheres embedded in a second elastomeric material.

In accordance with another aspect of the present exemplary embodiment, the second encapsulating layer is operative as a ground plane.

In accordance with another aspect of the present exemplary embodiment, the second encapsulating layer comprises conductive particles disposed between layers formed of the first elastomeric material.

In accordance with another aspect of the present exemplary embodiment, the conductive particles are spheres.

In accordance with another aspect of the present exemplary embodiment, the conductive particles are fibers.

In accordance with another aspect of the present exemplary embodiment, the second encapsulating layer is formed by an insulating layer and a conducting layer.

In accordance with another aspect of the present exemplary embodiment, the first encapsulating layer is formed from a thin, flexible, clear plastic material.

In accordance with another aspect of the present exemplary embodiment, the apparatus further comprises charge-retaining islands formed on the first encapsulating layer.

In accordance with another aspect of the present exemplary embodiment, the first encapsulating layer is formed from a third elastomeric material.

In accordance with another aspect of the present exemplary embodiment, the apparatus further comprises charge-retaining islands embedded in the first encapsulating layer.

In accordance with another aspect of the present exemplary embodiment, the apparatus further comprises a third encapsulating layer and a second media layer disposed between the second encapsulating layer and the third encapsulating layer.

In accordance with another aspect of the present exemplary embodiment, the third encapsulating layer is formed of a thin, flexible, clear plastic material.

In accordance with another aspect of the present exemplary embodiment, the apparatus further comprises charge-retaining islands formed on the third encapsulating layer.

In accordance with another aspect of the present exemplary embodiment, the third encapsulating layer is formed of a third elastomeric material.

In accordance with another aspect of the present exemplary embodiment, the apparatus further comprises charge-retaining islands embedded in the third encapsulating layer.

In accordance with another aspect of the present exemplary embodiment, the first elastomeric material has a percent elongation of less than 300.

In accordance with another aspect of the present exemplary embodiment, the display apparatus has a bend radius of approximately 25 mm.

In accordance with another aspect of the present exemplary embodiment, the flexible display apparatus comprises a first encapsulating plane formed of a plastic material having charge-retaining islands formed thereon, a second encapsulating plane formed of conductive particles disposed between layers of an elastomeric material and a media plane disposed between the first encapsulating plane and the second encapsulating plane.

In accordance with another aspect of the present exemplary embodiment, the plastic material is a thin, flexible, clear plastic material.

In accordance with another aspect of the present exemplary embodiment, the flexible display apparatus comprises a first encapsulating plane formed of a first elastomeric material having charge-retaining islands embedded therein, a second encapsulating plane formed of conductive particles disposed between layers of a second elastomeric material and a media plane disposed between the first encapsulating plane and the second encapsulating plane.

BRIEF DESCRIPTION OF THE DRAWINGS

FIG. 6 is a table illustrating materials to be potentially used in the embodiments of FIGS. 4 and 5;

DETAILED DESCRIPTION

The presently described embodiments of flexible electric paper make use of a conductive elastomeric ground plane. As noted above, the ground plane previously used in electric paper applications is typically formed of a high modulus, low elongation material—such as thin sheet metal or a metal oxide coated plastic sheet (such as Mylar material with continuous coating of ITO). As will become apparent from the discussion below, the proposed embodiment(s), using this conductive elastomeric ground plane, are designed as a sandwich structure having improved flexibility over that which is currently known.

In this regard, in one form of electric paper contemplated hereby, a display media, or media plane, is sandwiched between a conductive ground plane (or encapsulating layer or plane) and an image plane (or encapsulating layer or plane). The ground plane is formed from polymers or elastomers having high elongation and low modulus properties. In one form, this conductive ground plane also includes an insulative coating on the outer surface. The media plane, or the plane containing the bichromal microencapsulated spheres, is also constructed from low modulus, high elongation polymers or elastomers. The micro-encapsulated bichromal spheres are typically embedded within the polymer or elastomeric material.

While the ground plane and the media plane are provided in one embodiment to be stretchable and compressible to increase flexibility of the electric paper as a whole, the image plane, or the second encapsulating layer, is formed from high modulus, low elongation polymer such as plastic. A preferred form of this plastic is Mylar material. In this way, the image plane, or encapsulating plane, supports the media plane and the ground plane, is designed to be resistant to stretching and tearing and allows for convenient formation of charge-retaining islands thereon.

The resistance to stretch is a useful attribute for the image plane since image data will be transmitted to this plane. Unnecessary stretching of the plane may cause Moiré effects and unwanted image distortion.

Figure 1:
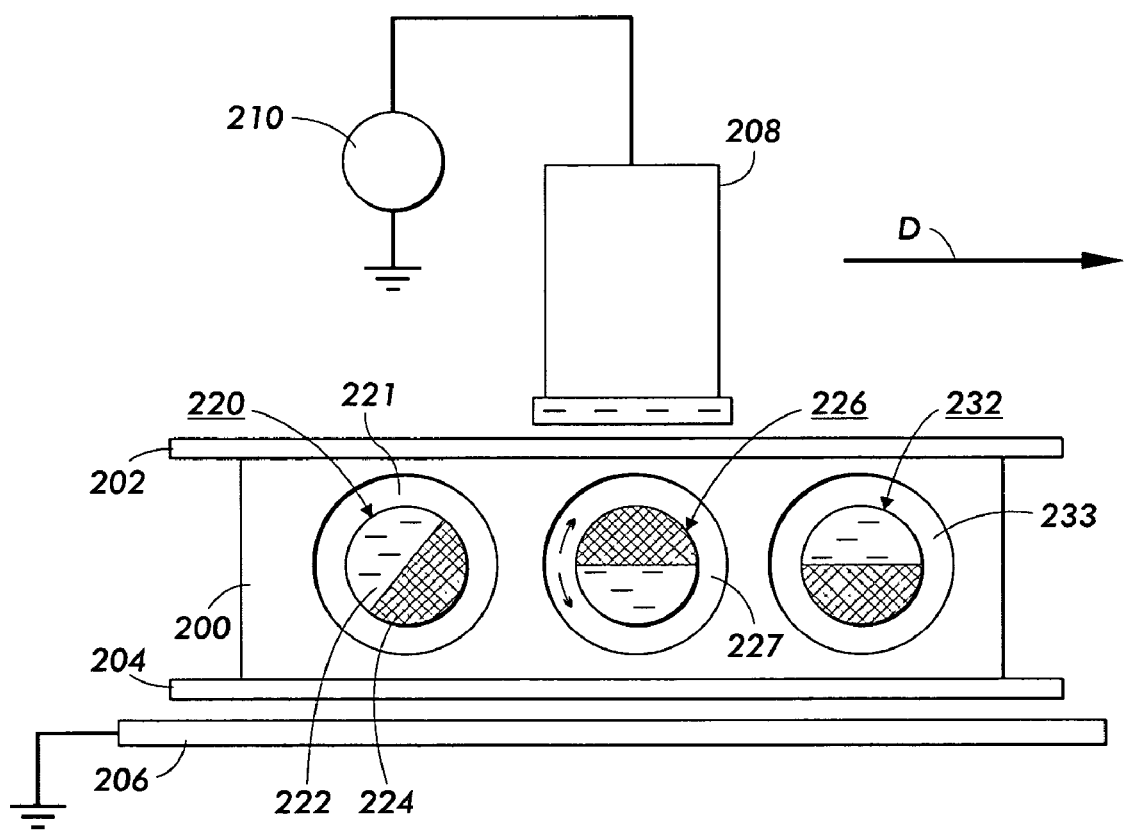
FIG. 1 is a cross-sectional view of a portion of a prior art electric paper configuration.
Figure 2:
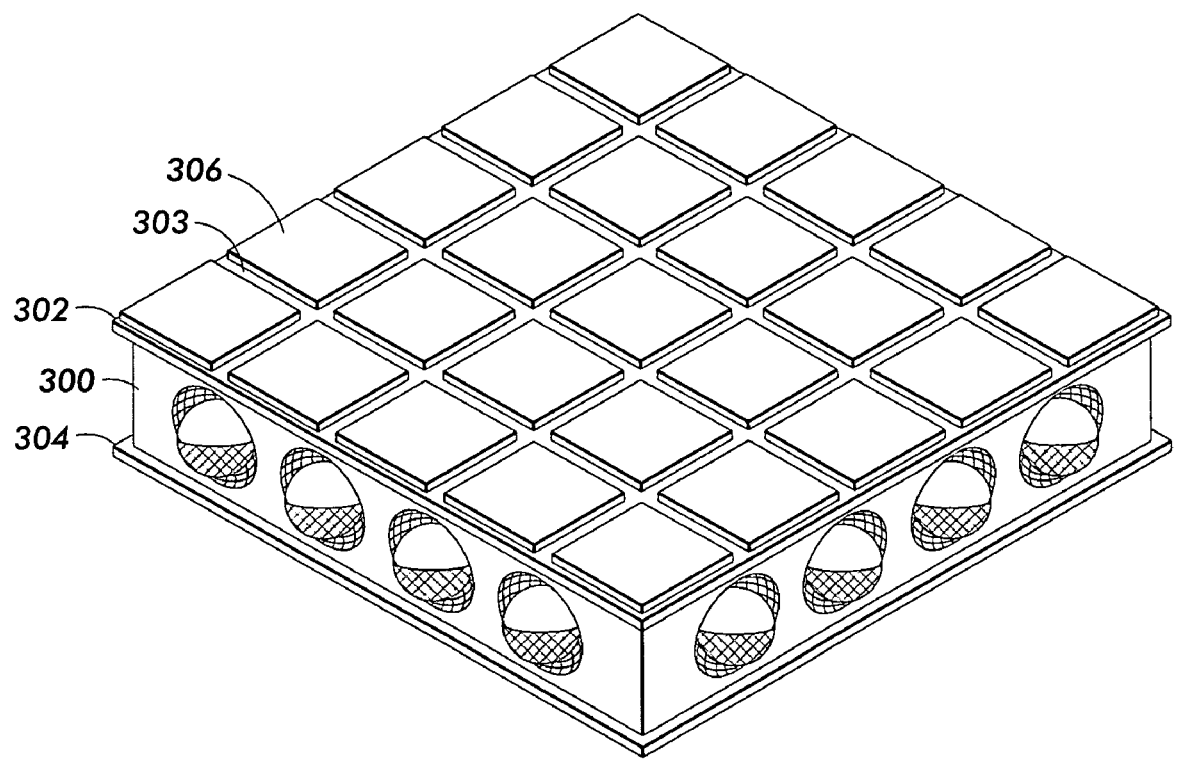
FIG. 2 is a perspective view of a prior art electric paper configuration.
Figure 3:
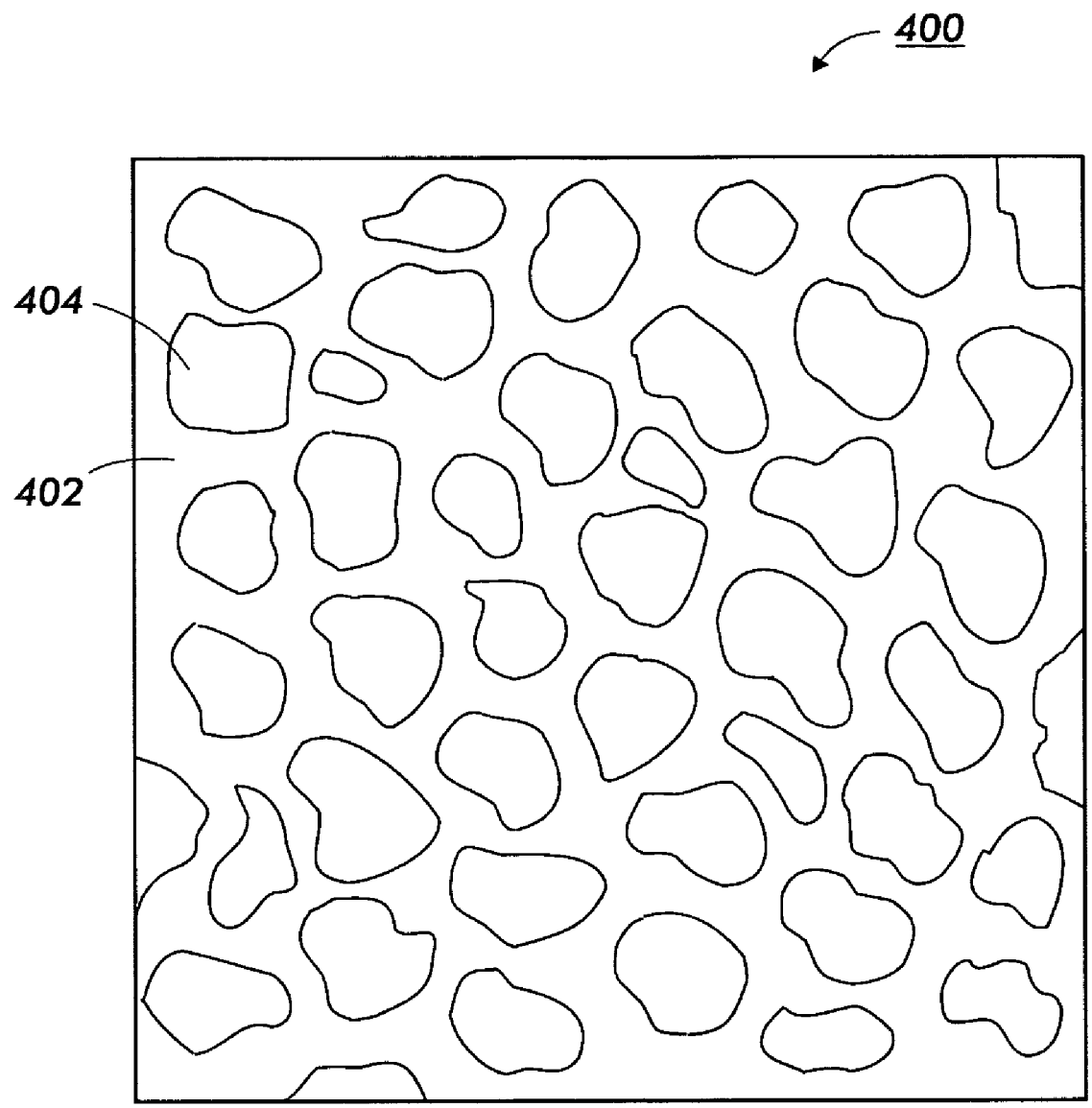
FIG. 3 is a top view of a prior art electric paper configuration.
Figure 4:
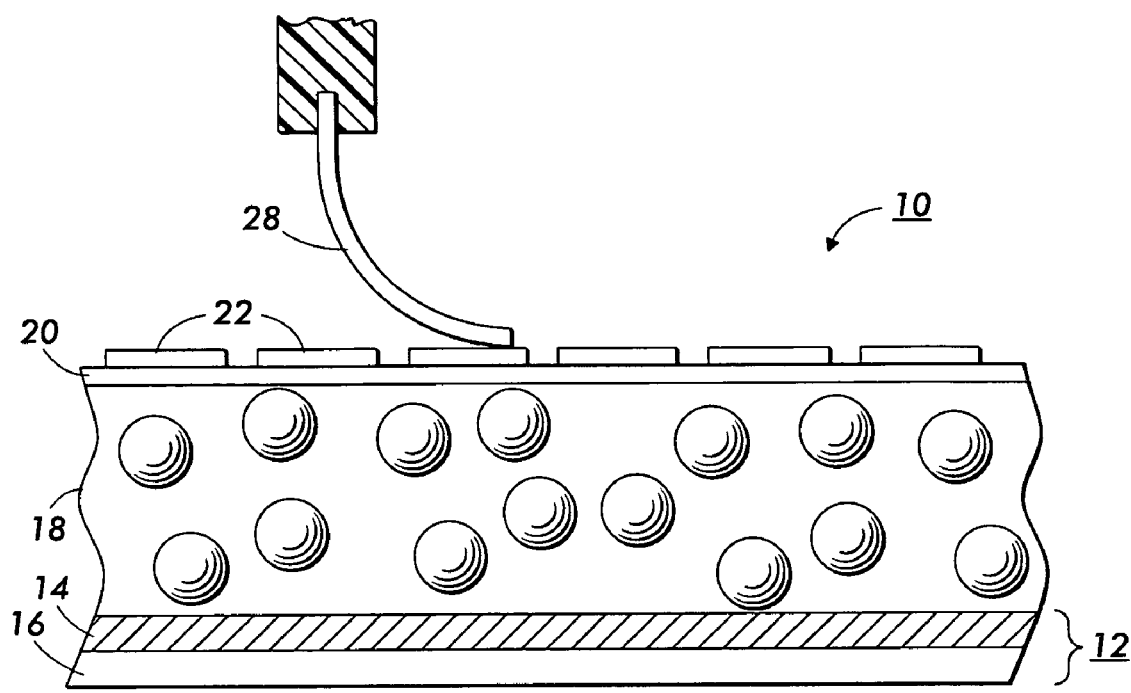
FIG. 4 illustrates an exemplary embodiment of flexible electric paper.

More particularly, with reference to FIG. 4, a flexible electric paper apparatus 10 is illustrated as having an encapsulating layer taking the form of an elastomeric ground plane 12. This elastomeric ground plane 12 is typically 5 to 10 micrometers in thickness. In addition, the elastomeric ground plane 12, as shown in this example, is comprised of a conductive layer 14 and an insulating layer 16. The materials that may be used for the conductive layer 14 include carbon-filled silicone, nickel-filled silicone, pure silver-filled silicone, silver glass-filled silicone, silver copper-filled silicone, or silver aluminum-filled silicone. Indeed, it has been determined that any conductive elastomeric material having a percent elongation of less than 300 may be used. These material types and specifications are listed in connection with FIG. 6.

The apparatus 10 also includes a media plane or layer 18. The media plane is typically 10 to 20 mils thick and, in one form, includes micro-encapsulated multi-chromal (e.g., bichromal) spheres embedded within an elastomeric material. Media planes of this type are well known in the field of electric paper. It should be understood that other types of media planes may also be incorporated in the embodiments disclosed herein (such as liquid crystal, . . . etc.), provided that any such media plane possesses the requisite flexibility to achieve the objectives disclosed herein and contemplated hereby. In addition, the media planes selected should also be compatible with the processes and techniques used to adhere together the layers of the electric paper structure. Of course, poor adhesion would be a detriment to flexibility.

A conductive island plane layer, or image plane or encapsulating layer, 20 is also illustrated. This layer may be formed with any of a variety of types of plastic material, but preferably is formed of a clear, thin, flexible plastic material such as Mylar material. The encapsulating layer 20 has formed thereon conductive islands 22. The configuration, formation and use of these islands are well known in the art.

It should be understood that the layers 12, 18 and 20 are adhered to one another as shown using any of a variety of known techniques. For example, suitable adhesive layers could simply be applied and cured to ensure that the layers of the electric paper structure remain intact and facilitate flexibility. The exact process of connecting the layers to one another will be a function of a variety of factors including the precise materials used, the desired durability and strength, and environmental conditions such as temperature, presence of oils, etc.

Also shown in FIG. 4 is a printhead 28 which serves to transfer charge to the islands, which then produces an electric field at the microencapsulated bichromal spheres, so that an image may be viewed on the electric paper. Typically, the image that is formed in the electric paper is viewed from the image plane of the structure.

Figure 5:
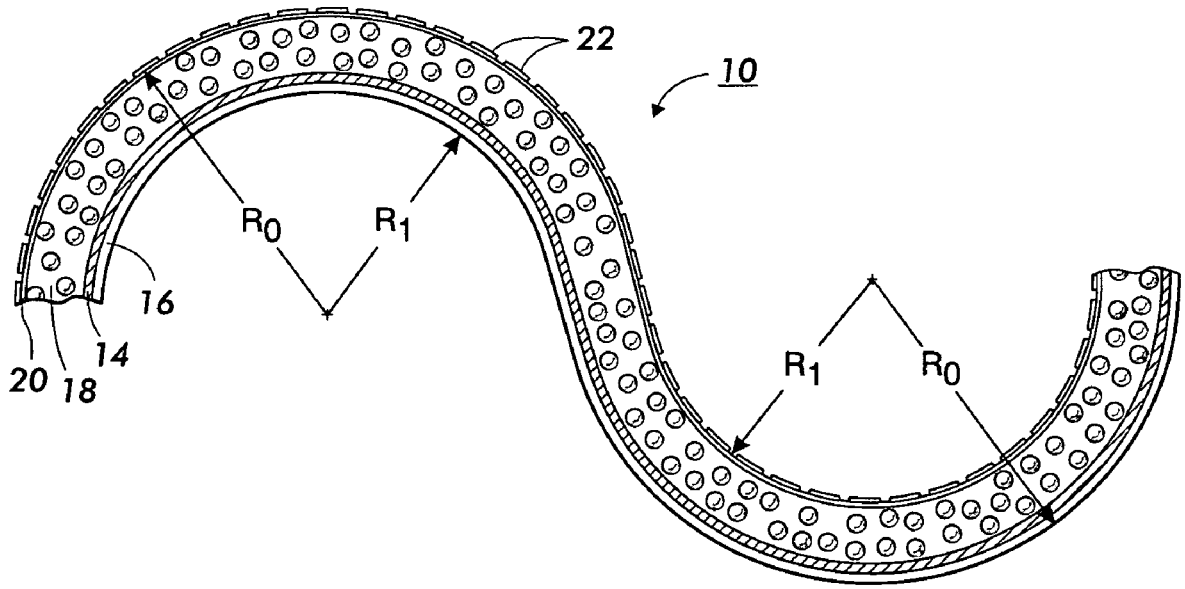
FIG. 5 is another view of the embodiment of FIG. 4.

Referring now to FIG. 5, a view of the electric paper apparatus 10 in a different configuration than that shown in FIG. 4 is illustrated. Again, the electric paper 10 comprises an insulating layer 16 that is adjacent a conductive layer 14. In this embodiment, the layers 14 and 16 form the ground plane 12. Also shown are the media plane or layer 18 and the image plane 20 having the charge retaining islands 22 formed thereon. In FIG. 5, the structure 10 is illustrated as being bent and curved in just one of many possible configurations that were not heretofore attainable by electric paper structures. Notably, the modulus of the plastic layer forming the image plane 20 is typically greater than the modulus of the elastomeric material used to form the ground plane 12 and the media plane 18. Further, for typical applications, the minimum bend radius (R1, as shown in FIG. 5) of the elastomeric material is 25 mils. Because total display thickness is approximately 40 mils, R0 (as shown in FIG. 5) is typically 65 mils.

The configuration of the electric paper structure shown in FIG. 5 makes clear that in this embodiment, the flexibility of the structure 10 is greatly improved over that which is known in the art. This flexibility is attained by use of the noted elastomeric ground plane in combination with the elastomeric media plane.

FIG. 6 illustrates a table that shows examples of possible material types for the elastomeric conductive layer 14. Notably, the elongation percentage for each of these types of material is 300 or lower.

Given a structure of this type, a small bend or fold radius is an inherent characteristic of this display system. The display can be rolled up or unrolled without delamination, assuming proper adhesion. Twisting and folding of the display is also accommodated. These features lend themselves to approaching the flexibility of 000real paper.

A variety of advantages are achieved through use of a flexible electric paper structure 10 as described above. For example, the system provides for highly flexible electric paper that is engineered with known materials. This type of structure allows for use of the electric paper concept within a variety of different systems including scroll printers of varying sizes—including billboard sized scroll printers and wand scroll printers and displays. Along with the newly realized flexibility, the bistability of the electric ink media contributes to this diverse use.

Figure 7:
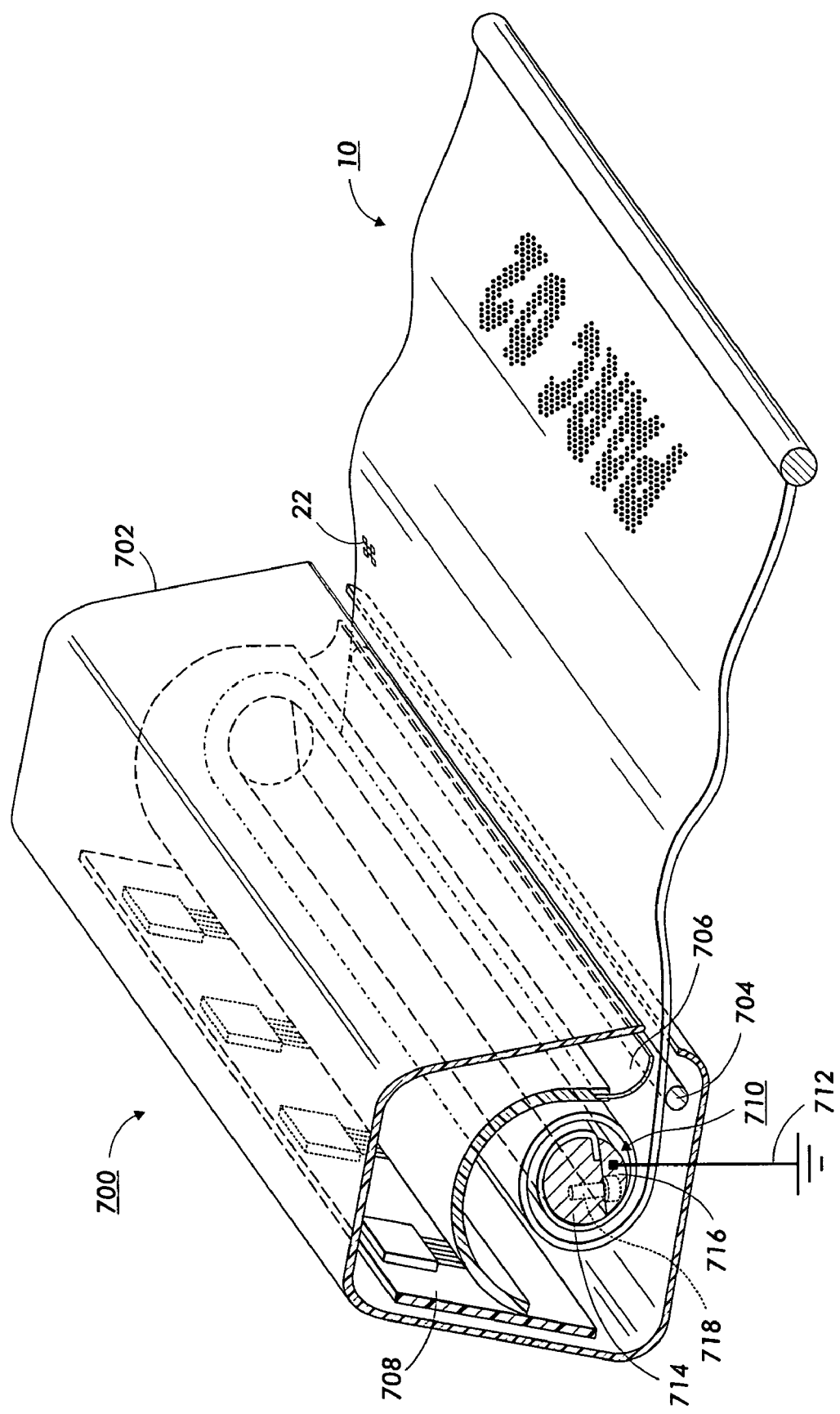
FIG. 7 is an illustration of a use of the embodiment of FIGS. 4 and 5.

Along these lines, FIG. 7 illustrates one example of a use of flexible electric paper as described in the embodiments herein. As shown, a scroll printer 700 is illustrated. The scroll printer is useful for printing on the electric paper 10 through manipulation of the conductive islands 22, illustratively shown on the paper 10. The printing process used for electric paper is well known in the art. The printer of FIG. 7 permits, however, printing on highly flexible electric paper. In this regard, the scroll printer itself is shown as having a case 702, a support roller 704, a printhead 706 and electronics 708. Also shown is an axle 710 upon which the electric paper can be rolled. Of course, the paper can be rolled out during the printing process in a variety of manners depending on the actual implementation of the printer. For example, a wand printer may roll and unroll the paper in different manners than, for example, a billboard sized printer. As shown, the system also includes a common ground 712.

Notably, as shown in the enlarged view of the axle, the paper 10 is shown as being clamped within the axle 710. In this regard, the axle 710 is comprised of a first portion 714 and a second portion 716 that are connected together using, for example, a screw or bolt or rivet 718. The screw 718 also provides a grounding line for the flexible ground plane.

In the device of FIG. 7, electric paper 10 of the embodiment described thus far can be conveniently written, rewritten and rolled and unrolled. Heretofore, this type of scroll printer could not be used with electric paper. The reason for this is that current electric paper, while somewhat flexible, does not demonstrate sufficient flexibility to be rolled and unrolled. As such, this type of configuration for use in a wand style scroll printer, or a billboard sized scroll printer, can be usefully implemented.

Use of a printer such as the printer 700 of FIG. 7 illustrates that increased flexibility of the electric paper structure as a whole, and the stretching of the elastomer that encapsulates the display particles, could also promote faster switch times and lower print voltage. In this regard, for Gyricon media, the bichromal spheres typically stick to the walls of the cavities once a voltage is induced therein. This effect promotes bistability but also increases the switching time. A set of erase heads is typically wiped over the media several times before the final print pass is executed. This erase sequence is referred to as a preconditioning cycle or an exercise cycle. The ability of the described embodiment of electric paper to stretch and contract the elastomer of the media plane, will have a positive effect on lowering the sticking force between the spheres and the cavities. Because the embodiment described herein is intended to be rolled up and then unrolled during the printing cycle of a scroll printer (such as printer 700), it may be possible to eliminate the erase cycle and any unnecessary erase heads.

Thus far, the ground plane 12 of the electric paper apparatus 10 has been described as primarily being formed of two layers, a conducting layer 14 and an insulating layer 16. It should be understood that other configurations of an elastomeric ground plane are contemplated. For example, FIGS. 8A through 8C show three alternative embodiments of the ground plane, designated in these FIGS. 8A through 8C as ground plane 12'.

Figure 8A:
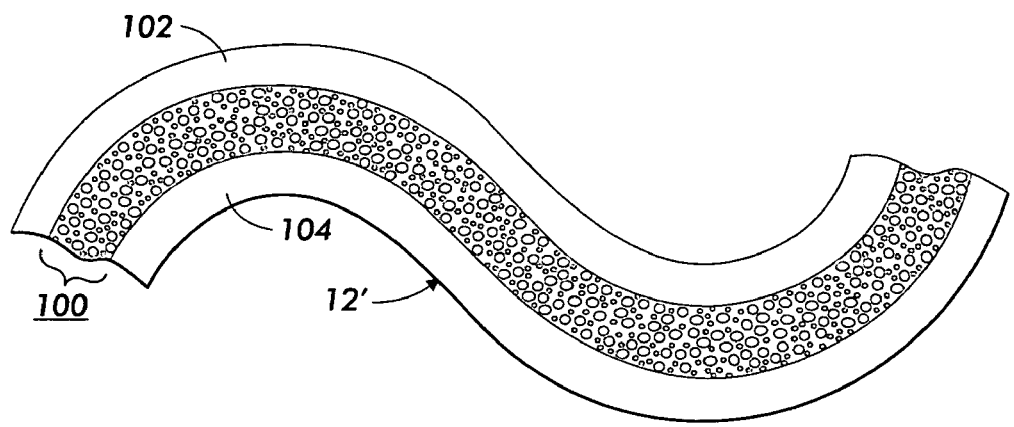
FIG. 8A-C illustrates an exemplary embodiment of a conductive layer of the embodiment of FIG. 4.
Figure 8B:
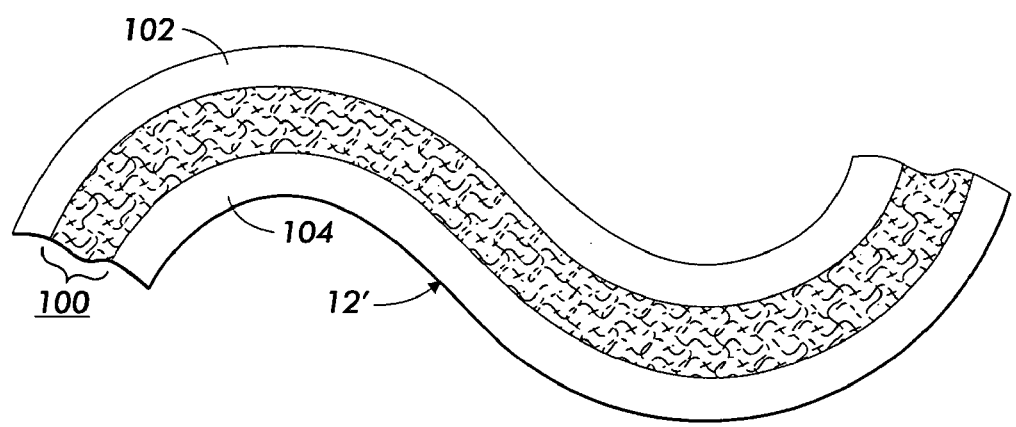
Figure 8C:
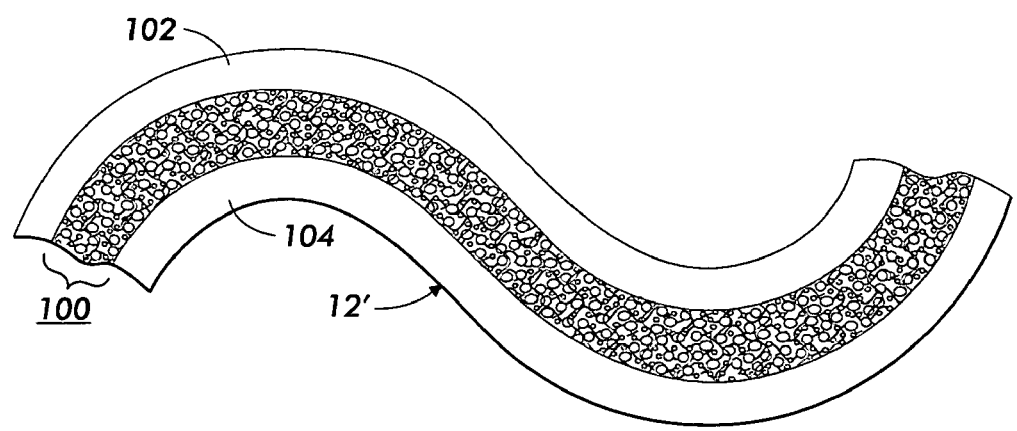

Referring to FIG. 8A, a ground plane 12' is formed from a layer of conductive particles 100 disposed between an elastomeric layer 102 and an elastomeric layer 104. Notably, conductive particle layer 100 is formed of conductive spheres or particles resembling or approaching the shape of a sphere. In an alternative embodiment, referring now to FIG. 8B, the layer of conducting particles takes the form of a layer of conducting fibers. As with particles, the fibers may be any form of material that resembles or is approaching the configuration of a fiber. In a still further embodiment, the layer of conductive particles 100 takes the form of a combination of spheres and fibers. Of course, it should be appreciated that the use of fibers or spheres is dependent upon the objectives of the implementers of the system. For example, spheres provide more flexibility but fibers typically provide more conductivity throughout the span of the conductive layer.

Figure 9A:
FIG. 9A-D illustrates a method for forming the conductive layer of FIG. 8.
Figure 9B:
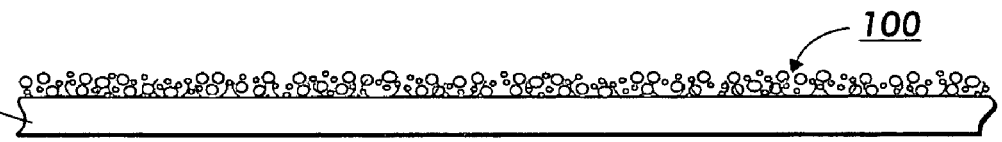
Figure 9C:
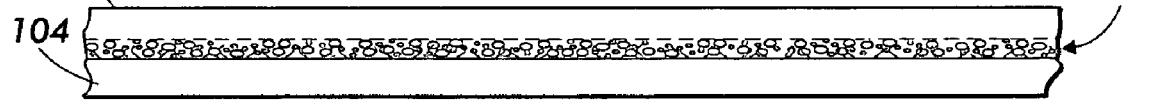
Figure 9D:
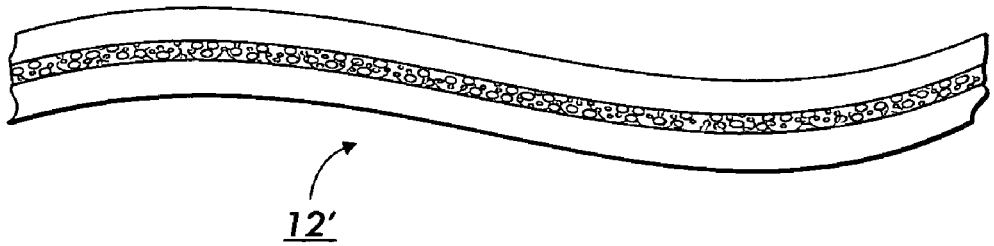

Whether fibers or spheres, or other particles (e.g., randomly-shaped particles), are used as a conductive material within the conductive layer 12', the formation process for the conductive layer of this embodiment will be similar. Referring now to FIG. 9A through 9D, the process for constructing an elastomeric ground plane as described in connection with FIGS. 8A through 8C is illustrated. First, a first elastomeric plane 104 is drawn down and left uncured (FIG. 9A). Next, the first elastomeric plane 104 is impregnated with conductive particles or fibers 100, and left uncured (FIG. 9B). At this point, the first elastomeric plane 104 and the conductive particles or fibers 100 are semi-cured. Next, a second elastomeric plane 102 is applied to cover the conductive particles or fibers 100 (FIG. 9C). The combination is then cured and released from the material upon which it was formed, e.g., clear, thin, flexible plastic material. Of course, other formation processes could be used. Likewise, variations of the conductive layer 12' may result in variations in the formation process.

It will be understood that the use of conductive particles or fibers 100 within elastomeric layers allows for improved flexibility of the conductive plane. This, in turn, provides for improved flexibility of the entire electric paper apparatus 10. Of course, a variety of different types of elastomers and particles could be used. For example, non-transparent particles or fibers could be used in the event that the ground plane is not on the viewing side of the paper. Conversely, transparent particles or fibers could be used, in conjunction with transparent elastomeric layers, to allow for viewing from that side of the electric paper.

The conductive particle layer may also have a variety of other uses in the system. For example, it could be used to shield electrical noise. It should be further understood that the elastomeric layers 102 and 104 could take a variety of forms of different elastomers.

Thus far, the described embodiments have included a flexible conductive ground plane or layer (12 or 12') of varying forms provided in combination with an elastomeric media plane 18 having micro-encapsulated bichromal spheres embedded therein, and a image plane, or encapsulating layer, formed of plastic or Mylar. The advantages of this configuration for uses such as scroll printers and the like should be apparent. For example, the use of the plastic film such as Mylar as the image plane or encapsulating layer 20 allow for flexibility of the paper but does not allow for undue stretchability. When devices such as a scroll printer are used to print on the electric paper, a lack of stretchability is an advantage.

However, not all implementations of electric paper will necessarily find a lack of stretchability useful. Therefore, a form of electric paper that is flexible, to at least the degree noted in connection with the described embodiments, and stretchable is desired.

Figure 10:
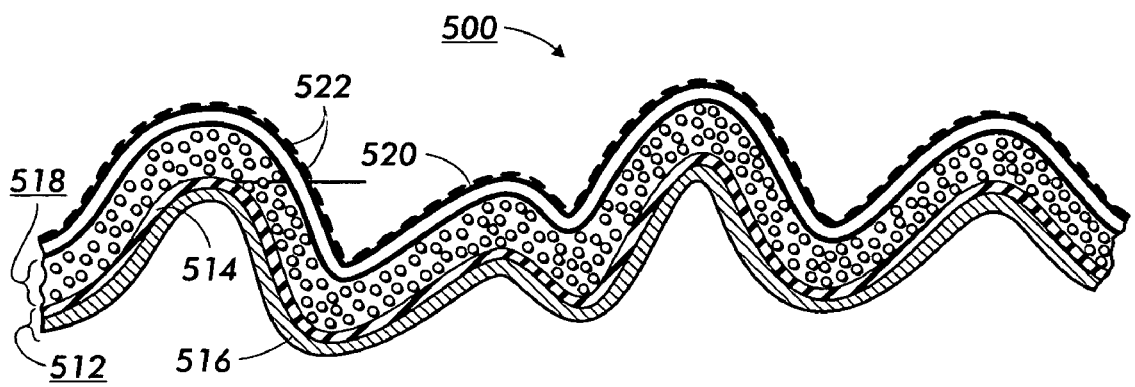
FIG. 10 is a cross-sectional view of another embodiment of flexible electric paper.

In this regard, referring to FIG. 10, an electric paper apparatus or structure 500 is illustrated. As shown, a ground plane or encapsulating layer 512, formed of an insulating layer 514 and a conductive layer 516, is illustrated. Of course, alternative embodiments of the ground plane contemplated herein may also be incorporated in this embodiment without sacrificing the general objectives disclosed herein and contemplated hereby. The media plane 518, having a print media or display element (such as microencapsulated bichromal spheres) embedded therein is also shown.

As with the previous embodiment, the insulating layer 516, conducting layer 514, and the media plane 518 are all formed of elastomeric material. However, in this embodiment, the other encapsulating layer, or image plane, 520 is also formed of an elastomeric material. As shown, islands such as that shown at 522 are embedded within the elastomeric layer 520. Embedding the islands within the elastomeric layer 520 may be accomplished using any of a variety of techniques. A simple draw down and curing process may accomplish this task. As an alternative, semiconductor-type fabrication techniques such as depositing and etching may also be implemented.

Figure 11:
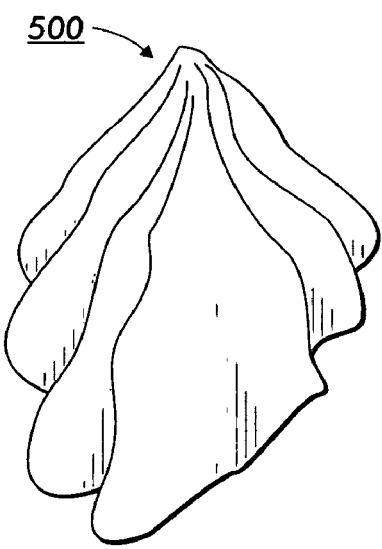
FIG. 11 is a perspective view of the embodiment of FIG. 10.

This embodiment allows for flexibility and stretchability of the electric paper. In this regard, with reference to FIG. 11, the electric paper 500 can be folded and bent in manners which resemble actual paper. This, of course, cannot be accomplished with current conventional electric paper implementations. Moreover, since elastomeric material is used throughout all layers of the electric paper structure, the paper can be crumpled into a tight wad and then unfolded—and will return to its original shape without signs of creasing or deformation.

The advantage of the embodiment of FIG. 10 is that the electric paper is flexible, durable, inexpensive, easily manufactured and easily prototyped. All planes of this device are made from an elastomeric material and the properties of each of these planes is similar. For example, the modulus of elasticity and the material composition for each plane are similar.

In this embodiment, a variety of alternatives can be realized in connection with materials used and uses of the electric paper. In one form, the elastomeric media and ground plane can be insulated through use of clear elastomeric planes. The elastomeric ground plane can be made with translucent or opaque conductive particles or fibers. The media plane can be formed by embedding microdisplay elements within an elastomer. The display elements can be electrophoretic, liquid crystal, . . . etc. The structure of the display package can be used for reusable electric paper applications or as a display for multi-addressed or fixed image displays. The islands can be printed, etched or embedded in the print plane. In addition, fiduciary marks to measure and adjust the media stretch could also be used.

Another advantage of an embodiment having all elastomeric layers, is that adhesion quality of the layers to one another are increased where the layers are formed with the same base material. For example, silicon-based material will adhere to other silicon-based layers with improved reliability.

Figure 12:
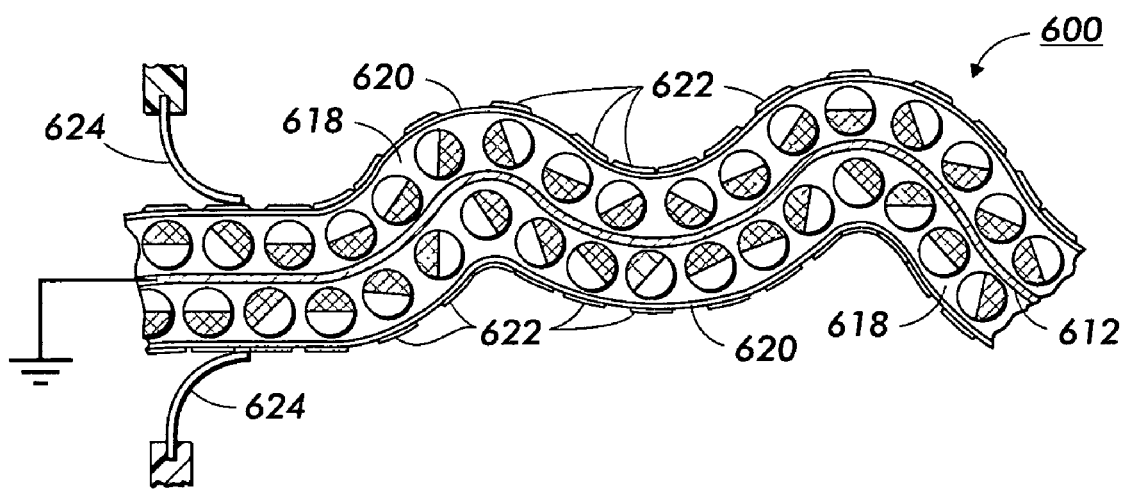
FIG. 12 is an illustration of another embodiment of flexible electric paper.

The embodiments described herein may be modified to produce a paper that allows for imaging on two sides. For large area scroll printer displays in retail and advertising, this feature would be useful because two different images could be displayed on opposite sides of the electric paper simultaneously. With reference now to FIG. 12, a dual-sided electric paper apparatus 600 is illustrated. As shown, a ground plane 612 is shown as having attached to each side thereof a media plane 618. Attached on opposite sides of the media plane are second encapsulating layers 620 which have formed thereon charge-retaining islands 622. Also shown are printheads 624 which operate as is well known in the art.

Notably, the ground plane 612 may take any of the forms described herein, or others, so long as the ground plane is flexible to provide the flexibility of the paper as contemplated herein. Preferably, the ground plane is non-transparent so that separate images can be viewed on each side of the paper 600. Moreover, the layers 620 may likewise take any of the forms contemplated herein, depending on the objectives of the implementation. It should be understood that the elastomeric modulus of the media planes should be approximately the same while the elastomeric modulus of the ground plane is significantly greater than that of the media planes. This will allow for sufficient flexibility to meet the objectives of the present embodiments.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A flexible display apparatus comprising:
a first encapsulating layer;
a second encapsulating layer formed of at least a first elastomeric material, the second encapsulating layer being a ground plane for the flexible display apparatus; and,
a media layer disposed between the first encapsulating layer and the second encapsulating layer, the media layer comprising microencapsulated multi-chromal spheres embedded in a second elastomeric material.

2. The apparatus as set forth in claim 1 wherein the second encapsulating layer comprises conductive particles disposed between layers formed of the first elastomeric material.

3. The apparatus as set forth in claim 2 wherein the conductive particles are spheres.

4. The apparatus as set forth in claim 2 wherein the conductive particles are fibers.

5. The apparatus as set forth in claim 2 wherein the conductive particles have random shapes.

6. The apparatus as set forth in claim 2 wherein the conductive particles are a mixture of spheres and fibers.

7. The apparatus as set forth in claim 2 wherein the conductive particles are a mixture of spheres, fibers and randomly-shaped particles.

8. The apparatus as set forth in claim 1 wherein the second encapsulating layer is formed by an insulating layer and a conducting layer.

9. The apparatus as set forth in claim 1 wherein the first encapsulating layer is formed from clear, thin, flexible plastic material.

10. The apparatus as set forth in claim 9 further comprising charge-retaining islands formed on the first encapsulating layer.

11. The apparatus as set forth in claim 1 wherein the first encapsulating layer is formed from a third elastomeric material.

12. The apparatus as set forth in claim 11 further comprising charge-retaining islands embedded in the first encapsulating layer.

13. The apparatus as set forth in claim 1 further comprising a third encapsulating layer and a second media layer disposed between the second encapsulating layer and the third encapsulating layer.

14. The apparatus as set forth in claim 13 wherein the third encapsulating layer is formed of clear, thin, flexible plastic material.

15. The apparatus as set forth in claim 14 further comprising charge-retaining islands formed on the third encapsulating layer.

16. The apparatus as set forth in claim 13 wherein the third encapsulating layer is formed of a third elastomeric material.

17. The apparatus as set forth in claim 16 further comprising charge-retaining islands embedded in the third encapsulating layer.

18. The apparatus as set forth in claim 1 wherein the first elastomeric material has a percent elongation of less than 300.

19. The apparatus as set forth in claim 1 wherein the display apparatus has a bend radius of approximately 25 mm or less.

20. A flexible display apparatus comprising:

a first encapsulating plane formed of a plastic material having charge-retaining islands formed thereon;

a second encapsulating plane formed of conductive particles disposed between layers of an elastomeric material; and, a media plane disposed between the first encapsulating plane and the second encapsulating plane.

21. The apparatus as set forth in claim 20 wherein the plastic material is clear, thin, flexible plastic material.

22. A flexible display apparatus comprising:

a first encapsulating plane formed of a first elastomeric material having charge-retaining islands embedded therein;

a second encapsulating plane formed of conductive particles disposed between layers of a second elastomeric material; and, a media plane disposed between the first encapsulating plane and the second encapsulating plane.

* * * * *